(12) United States Patent
Lee et al.

(10) Patent No.: US 10,892,101 B2
(45) Date of Patent: Jan. 12, 2021

(54) MULTILAYER CERAMIC CAPACITOR

(71) Applicant: SAMSUNG ELECTRO-MECHANICS CO., LTD., Suwon-Si (KR)

(72) Inventors: Jin Woo Lee, Suwon-Si (KR); Hyun Hee Gu, Suwon-Si (KR); Eui Hyun Jo, Suwon-Si (KR); Jong Ho Lee, Suwon-Si (KR); Eun Jin Kim, Suwon-si (KR); Hye Young Choi, Suwon-Si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 15 days.

(21) Appl. No.: 16/184,674

(22) Filed: Nov. 8, 2018

(65) Prior Publication Data

US 2020/0082987 A1    Mar. 12, 2020

(30) Foreign Application Priority Data

Sep. 6, 2018    (KR) .......................... 10-2018-0106589

(51) Int. Cl.

| | |
|---|---|
| *H01G 4/232* | (2006.01) |
| *H01G 4/248* | (2006.01) |
| *H01G 4/30* | (2006.01) |
| *H01G 4/12* | (2006.01) |
| *H01G 4/005* | (2006.01) |
| *H01G 4/228* | (2006.01) |

(52) U.S. Cl.
CPC ............... *H01G 4/30* (2013.01); *H01G 4/005* (2013.01); *H01G 4/1227* (2013.01); *H01G 4/228* (2013.01); *H01G 4/232* (2013.01); *H01G 4/248* (2013.01)

(58) Field of Classification Search
None
See application file for complete search history.

(56) References Cited

U.S. PATENT DOCUMENTS

| | | | |
|---|---|---|---|
| 2008/0081200 A1 | 4/2008 | Katsube et al. | |
| 2009/0161293 A1* | 6/2009 | Takeuchi | H01G 4/005 361/321.4 |
| 2013/0088810 A1 | 4/2013 | Yang et al. | |

(Continued)

FOREIGN PATENT DOCUMENTS

| | | |
|---|---|---|
| JP | 2000-100647 A | 4/2000 |
| JP | 2012-199597 A | 10/2012 |

(Continued)

OTHER PUBLICATIONS

Office Action issued in corresponding Korean Patent Application No. 10-2018-0106589 dated Jul. 10, 2019.

*Primary Examiner* — Dion Ferguson
(74) *Attorney, Agent, or Firm* — Morgan, Lewis & Bockius LLP (57) ABSTRACT

A multilayer ceramic capacitor includes a body including a dielectric layer and an internal electrode, and an external electrode disposed on the body. The external electrode includes an electrode layer connected to the internal electrode, a first plating portion disposed on the electrode layer and having a thickness ranging from 0.3 µm to 1 µm, and a second plating portion disposed on the first plating portion.

17 Claims, 4 Drawing Sheets

(56) References Cited

U.S. PATENT DOCUMENTS

| | | | | |
|---|---|---|---|---|
| 2013/0128411 | A1* | 5/2013 | Tahara | C25D 3/56 |
| | | | | 361/321.2 |
| 2014/0204502 | A1* | 7/2014 | Chun | H01G 4/30 |
| | | | | 361/301.4 |
| 2014/0321025 | A1* | 10/2014 | Saito | H01G 4/232 |
| | | | | 361/305 |
| 2016/0071647 | A1 | 3/2016 | Nishisaka et al. | |
| 2016/0276106 | A1* | 9/2016 | Kuroiwa | H01G 4/30 |
| 2017/0047163 | A1* | 2/2017 | Tomizawa | H01G 4/1227 |
| 2017/0069428 | A1* | 3/2017 | Shimizu | H01G 4/30 |
| 2017/0330689 | A1 | 11/2017 | Hatanaka et al. | |
| 2018/0108482 | A1 | 4/2018 | Kogure et al. | |

FOREIGN PATENT DOCUMENTS

| | | |
|---|---|---|
| KR | 10-2008-0010452 A | 1/2008 |
| KR | 10-2016-0030372 A | 3/2016 |
| KR | 10-2018-0042125 A | 4/2018 |
| KR | 10-2018-0064349 A | 6/2018 |
| WO | 2016/098702 A1 | 6/2016 |

\* cited by examiner

MULTILAYER CERAMIC CAPACITOR

CROSS-REFERENCE TO RELATED APPLICATION(S)

This application claims benefit of priority to Korean Patent Application No. 10-2018-0106589 filed on Sep. 6, 2018 in the Korean Intellectual Property Office, the disclosure of which is incorporated herein by reference in its entirety.

TECHNICAL FIELD

The present disclosure relates to a multilayer ceramic capacitor.

BACKGROUND

A multilayer ceramic capacitor (MLCC) is an important chip component used in industrial fields such as communications, computing, electronic appliance manufacturing, vehicle manufacturing, and others, as it is small-sized, can secure high capacity and can be easily installed. A multilayer ceramic capacitor is also a core passive device used in a variety of electric devices, electronic devices and information communication devices, such as cellular phones, computers, digital TVs, and the like.

Recently, as the demand for mobile devices, wearable devices, and the like, has increased, it has been important to secure moisture resistance reliability in multilayer ceramic capacitors, to allow for use thereof in diverse climates and environments.

Generally, moisture resistance reliability is secured by forming an Ni-plated layer and an Sn-plated layer on an electrode layer of an external electrode of a multilayer ceramic capacitor. However, in the case of using the general plating method, there has been a problem of discontinuation of plating due to discontinuation of an electrode layer, a glass beading phenomenon in which glass, included in an electrode layer, protrudes externally, or the like. The portion in which plating discontinuation occurs may become a route for moisture penetration, which may degrade moisture resistance reliability.

SUMMARY

An aspect of the present disclosure is to provide a multilayer ceramic capacitor having excellent moisture resistance reliability by preventing plating discontinuation.

According to an aspect of the present disclosure, a multilayer ceramic capacitor includes a body including a dielectric layer and an internal electrode, and an external electrode disposed on the body. The external electrode includes an electrode layer connected to the internal electrode, a first plating portion disposed on the electrode layer and having a thickness ranging from 0.3 µm to 1 µm, and a second plating portion disposed on the first plating portion.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, irreverent descriptions will be omitted to clearly describe the present disclosure, and to clearly express a plurality of layers and areas, thicknesses may be magnified. The same elements having the same function within the scope of the same concept will be described with use of the same reference numeral. Further, throughout the specification, it will be understood that when a part "includes" an element, it can further include another element, not excluding another element, unless otherwise indicated.

In the drawings, an X direction is a second direction, an L direction, or a length direction, a Y direction is a third direction, a W direction, or a width direction, a Z direction is a first direction, a layering direction, a T direction, or a thickness direction.

Multilayer Ceramic Capacitor

Figure 1:
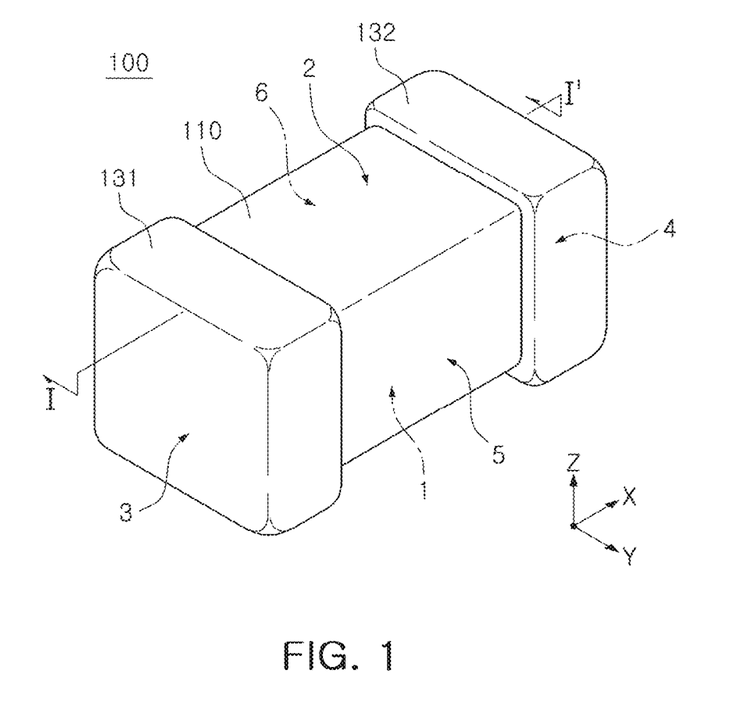
FIG. 1 is a perspective diagram illustrating a multilayer ceramic capacitor according to an exemplary embodiment in the present disclosure.

FIG. 1 is a perspective diagram illustrating a multilayer ceramic capacitor according to an exemplary embodiment.

Figure 2:
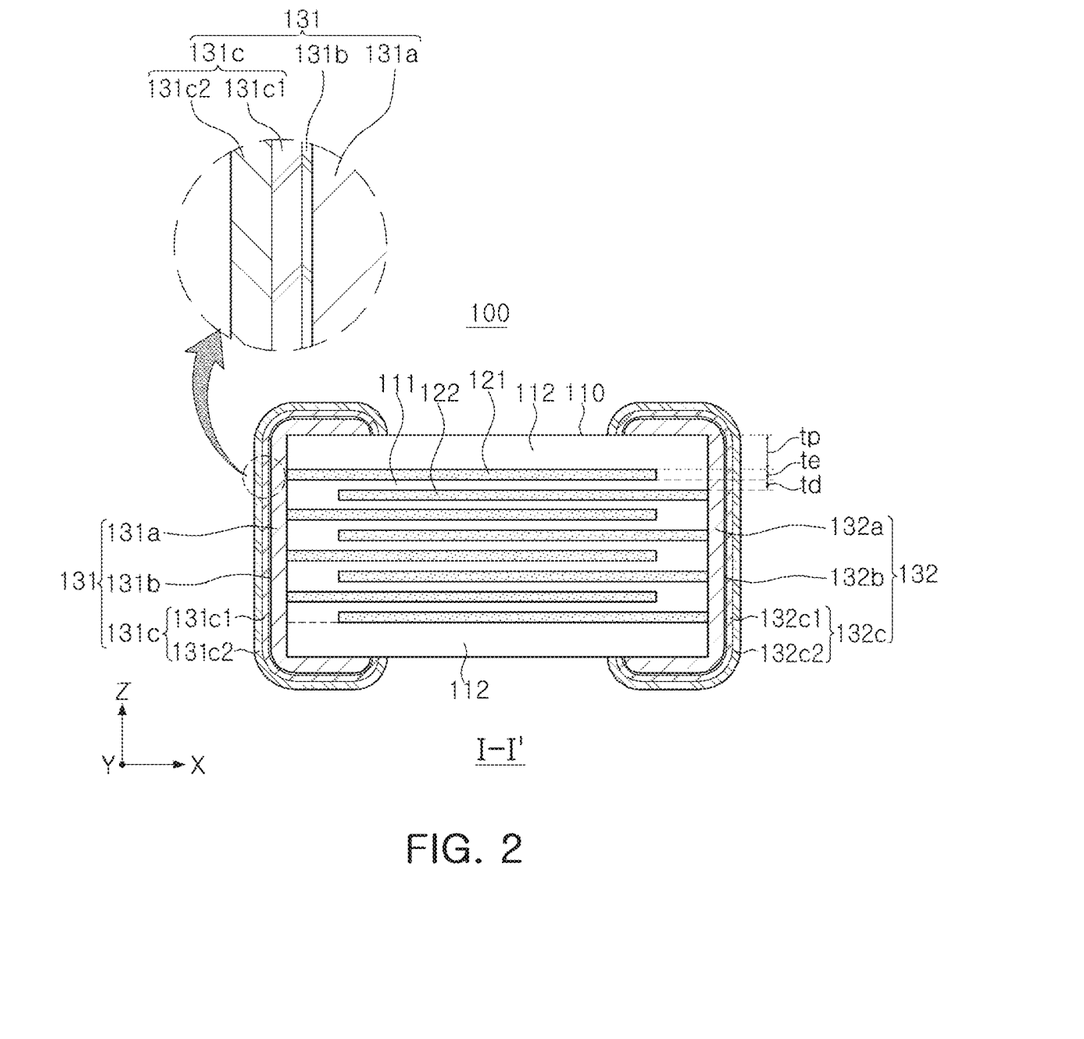
FIG. 2 is a cross-sectional diagram taken along line I-I' in FIG. 1.

FIG. 2 is a cross-sectional diagram taken along line I-I' in FIG. 1.

Figure 3:
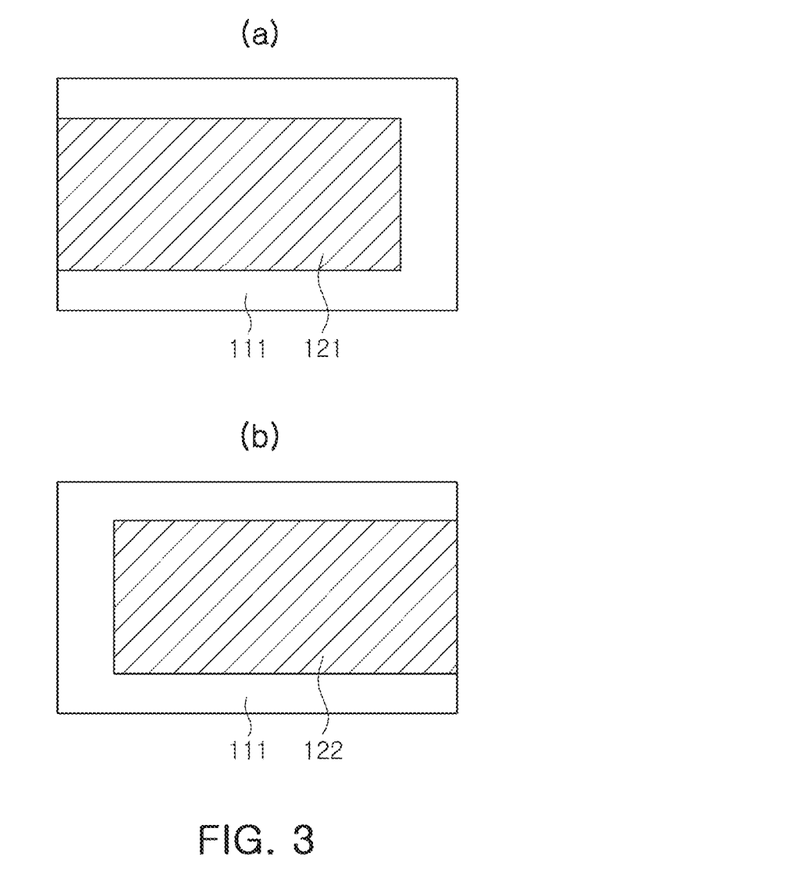
FIG. 3 is a diagram illustrating a ceramic green sheet on which an internal electrode is printed to manufacture a body of a multilayer ceramic capacitor.

FIG. 3 is a diagram illustrating a ceramic green sheet on which an internal electrode is printed to manufacture a body of a multilayer ceramic capacitor.

Referring to FIGS. 1 to 3, a multilayer ceramic capacitor 100 according to an example embodiment may include a body 110 configured to include a dielectric layer 111 and internal electrodes 121 and 122, and external electrodes 131 and 132 disposed on the body. The external electrode 131 may include an electrode layer 131a connected to the internal electrodes 121, a first plating portion 131b disposed on the electrode layer 131a and having a thickness ranging from 0.3 µm to 1 µm, and a second plating portion 131c disposed on the first plating portion 131b. The external electrode 132 may include an electrode layer 132a connected to the internal electrodes 122, a first plating portion 132b disposed on the electrode layer 132a and having a thickness ranging from 0.3 µm to 1 µm, and a second plating portion 132c disposed on the first plating portion 132b.

The dielectric layer 111 and the internal electrodes 121 and 122 may be alternately layered in the body 110.

There may be no particular limitation on a shape of the body 110, but as illustrated in the diagram, the body 110 may have a hexagonal shape or a shape similar to a hexagon. Due to shrinkage of a ceramic powder included in the body 110 during a process of sintering, the body 110 may not be an exact hexagon, but may have a substantially hexagonal shape.

The body 110 may have the first and second surfaces 1 and 2 opposing each other in a thickness direction (a Z direction), the third and fourth surfaces 3 and 4 connected to the first and second surfaces 1 and 2 and opposing each other in a length direction (an X direction), and the fifth and sixth surfaces 5 and 6 connected to the first and second surfaces 1 and 2 and the third and fourth surfaces 3 and 4, and opposing each other in a width direction (a Y direction).

The plurality of dielectric layers 111 forming the body 110 may be in a sintered state, and the dielectric layers 111 may be integrated, such that boundaries between adjacent dielectric layers 111 may be difficult to identify without using a scanning electron microscope (SEM).

A material forming the dielectric layer 111 may not be particularly limited as long as sufficient capacitance is able to be obtained. For example, a material of the dielectric layer 111 may be a barium titanate ($BaTiO_3$) power. As the material composing the dielectric layer 111, various ceramic additives, organic solvents, coupling agents, dispersing agents, and the like, may be added in addition to barium titanate ($BaTiO_3$) powder, or the like, depending on an intended purpose.

Meanwhile, there may be no need to particularly limit a thickness of the dielectric layer 111.

However, in the case in which the dielectric layer is configured to be less than 0.6 µm, particularly, in the case in which a thickness of the dielectric layer is 0.4 µm or less, moisture resistance reliability may degrade.

As described below, according to the exemplary embodiment, moisture resistance reliability may improve as a plating discontinuation phenomenon is prevented by disposing the first plating portions 131b and 132b having a thickness ranging from 0.3 to 1 µm between the electrode layers 131a and 132a and the second plating portions 131c and 132c. Accordingly, sufficient moisture resistance reliability may be secured even in the case in which a thickness of the dielectric layer is 0.4 µm or less.

Thus, even in the case in which the thickness of the dielectric layer is 0.4 µm or less, a moisture resistance reliability effect may become more prominent.

A thickness of the dielectric layer 111 may refer to an average thickness of the dielectric layers 111 interposed between the first and second internal electrodes 121 and 122.

The average thickness of the dielectric layers 111 may be obtained by scanning a cross-section of the body 110 taken in a length and thickness direction (an L-T direction) using a scanning electron microscope (SEM).

For example, a random image of the dielectric layer may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points with equal intervals may be measured in a capacitance forming portion which refers to an area of overlap between the first and second internal electrodes 121 and 122.

In this case, the ceramic electronic component 100 according to the exemplary embodiment may include the capacitance forming portion configured to form capacitance including the first and second internal electrodes disposed in the body 110 and opposing each other with the dielectric layer interposed therebetween, and a cover portion 112 configured to be formed in upper and lower portions of the capacitance forming portion.

The cover portion 112 may not include an internal electrode, and may include the same material as the material of the dielectric layer 111. In other words, the cover portion 112 may include a ceramic material, such as a barium titanate ($BaTiO_3$) ceramic material, for example.

The cover portion 112 may be formed by layering a single dielectric layer or two or more dielectric layers on upper and lower surfaces of the capacitance forming portion in upper and lower directions, respectively, and may serve to prevent damage to an internal electrode caused by physical or chemical stress.

A thickness of the cover portion 112 may not be particularly limited. However, to achieve miniaturization and high capacitance of the ceramic electronic component, a thickness tp of the cover portion 112 may be 20 µm or less, but in this case, moisture resistance reliability may degrade as a moisture penetration route is reduced.

As described above, according to the exemplary embodiment, moisture resistance reliability may improve as a plating discontinuation phenomenon is prevented by disposing the first plating portions 131b and 132b having a thickness ranging from 0.3 to 1 µm between the electrode layers 131a and 132a and the second plating portions 131c and 132c. Accordingly, sufficient moisture resistance reliability may be secured even in the case in which a thickness tp of the cover portion 112 is 20 µm or less.

Thus, even in the case in which the thickness tp of the cover portion 112 is 20 µm or less, a moisture resistance reliability effect may become more prominent.

The internal electrodes 121 and 122 may be alternately layered with the dielectric layer, and may include the first and second internal electrodes 121 and 122. The first and second internal electrodes 121 and 122 may be alternately disposed to oppose each other with the dielectric layer 111 interposed therebetween, and may be exposed to the third and fourth surfaces 3 and 4 of the body 110, respectively.

Referring to FIG. 2, the first internal electrode 121 may be spaced apart from the fourth surface 4, and may be exposed through the third surface 3. The second internal electrode 122 may be spaced apart from the third surface 3, and may be exposed through the fourth surface 4.

In this case, the first and second internal electrodes 121 and 122 may be electrically separated from each other by the dielectric layer 111 interposed therebetween. Referring to FIG. 3, the body 110 may be formed by alternately layering a ceramic green sheet on which the first internal electrode 121 is printed and a ceramic green sheet on which the second internal electrode 122 is printed, and being sintered.

A material forming the first and second internal electrodes 121 and 122 may not be particularly limited, and may be formed of a conductive paste comprised of more than one material among noble metals such as palladium (Pd), a palladium-silver (Pd—Ag) alloy, and the like, and nickel (Ni) and copper (Cu), for example.

As the method of printing a conductive paste, a screen printing method, a gravure printing method, or the like, may be used, but the method of printing is not limited thereto.

Thicknesses of the first and second internal electrodes 121 and 122 may not be particularly limited. However, to achieve miniaturization and high capacitance of the multilayer ceramic capacitor, the thicknesses to of the first and second internal electrodes 121 and 122 may be 0.4 µm or less.

The thicknesses of the first and second internal electrodes 121 and 122 may refer to an average thickness of the first and second internal electrodes 121 and 122.

An average thickness of the first and second internal electrodes 121 and 122 may be obtained by scanning a cross-section of the body 110 taken in a length and thickness direction (an L-T direction) using an SEM.

For example, a random image of the first and second internal electrodes 121 and 122 may be extracted from a scanned image of a cross-section taken in a length and thickness direction (an L-T direction), created by cutting a central portion of the body 110 in a width direction, using an SEM, and an average of thicknesses of 30 points at equal intervals, measured in a length direction, may be calculated.

The 30 points with equal intervals may be measured in a capacitance forming portion which refer to an area of overlap between the first and second internal electrodes 121 and 122.

The external electrodes 131 and 132 may be disposed in the body 110, and may include the electrode layers 131a and 132a, the first plating portions 131b and 132b, and the second plating portions 131c and 132c.

The external electrodes 131 and 132 may include the first and second external electrodes 131 and 132 connected to the first and second internal electrodes 121 and 122.

The first and second external electrodes 131 and 132 may be configured to be extended from the third and fourth surfaces 3 and 4 to portions of the first and second surfaces 1 and 2 of the body 110. The first and second external electrodes 131 and 132 may also extend from the third and fourth surfaces 3 and 4 to portions of the fifth and sixth surfaces 5 and 6.

The electrode layers 131a and 132a may serve to mechanically bond the body 110 and the external electrodes 131 and 132, and also serve to electrically and mechanically bond the internal electrodes 121 and 122 and the external electrodes 131 and 132.

The electrode layers 131a and 132a may be formed of any material having electrical conductivity such as a metal, and a specific material thereof may be determined by considering electrical properties, structural stability, and the like.

For example, the electrode layers 131a and 132a may be a sintered electrode including a conductive metal and glass, or may be a resin electrode including a conductive metal and a base resin.

Also, the electrode layers 131a and 132a may be formed by an atomic layer deposition (ALD) process, a molecular layer deposition (MLD) process, a chemical vapor deposition (CVD) process, a sputtering process, and the like.

However, in the case in which the electrode layers 131a and 132a are sintered electrodes including a conductive metal and glass, the plating will be discontinuous due to disconnection of an electrode layer, a glass beading phenomenon in which glass included in an electrode layer protrudes externally, or the like, if a general plating method is used. The plating discontinuation may cause a problem in moisture resistance reliability. According to the exemplary embodiment, the plating discontinuation may be prevented by disposing the first plating portion 131b and 132b having a thickness ranging from 0.3 to 1 μm between the second plating portions 131c and 132c and the electrode layers 131a and 132a as a portion in which glass protrudes is also plated.

Thus, in the case in which the electrode layers 131a and 132a includes a conductive metal and glass, the improvement of moisture resistance reliability according to the exemplary embodiment may become more effective.

The glass may serve to bond the body 110 and the external electrodes 130 and 140 mechanically, and the conductive metal may serve to bond the internal electrodes 121 and 122 and the external electrodes 131 and 132 electrically and mechanically. In this case, the conductive metal may be Cu.

The first plating portions 131b and 132b may have a thickness ranging from 0.3 μm to 1 μm, and disposed on the electrode layers 131a and 132a. The second plating portions 131c and 132c may be disposed on the first plating portions 131b and 132b.

In the case in which thicknesses of the first plating portions 131b and 132b are less than 0.3 μm, the effect of preventing plating discontinuation may be insufficient, and in the case in which thicknesses of the first plating portions 131b and 132b are greater than 1 μm, the external electrodes may become thick. Accordingly, a volume of the multilayer ceramic capacitor may increase, and as capacitance per unit volume decreases, it may be difficult to achieve miniaturization and high capacity of the multilayer ceramic capacitor.

The second plating portions 131c and 132c may be a general plating layer used in the related art, and may include the Ni plated layers 131c1 and 132c1 and the Sn plated layers 131c2 and 132c2. In other words, the second plating portions 131c and 132c may include the Ni plated layers 131c1 and 132c1 and the Sn plated layers 131c2 and 132c2 sequentially disposed on the first plating portions 131c and 132c.

Generally, a plating layer of an external electrode of a multilayer ceramic capacitor may be comprised of an Ni plated layer and an Sn plated layer formed on the Ni plated layer on an electrode layer, and the plating layer may be formed by sequentially plating Ni and Sn on the electrode layer.

However, the conventional, general plating layer may have a problem of plating discontinuation due to disconnection of an electrode layer, a glass beading phenomenon in which glass included in the electrode layer protrudes externally, and it is of concern that a non-plated portion becomes a route for moisture penetration, which may degrade moisture resistance reliability. Plating discontinuation occurs because, when Sn is plated, Sn grows in a horizontal direction, but when Ni is plated, Ni grows in a vertical direction. In other words, in the case of plating Sn, plating discontinuation does not generally occur as Sn usually grows in a direction parallel to a surface of a body (a horizontal direction) such that Sn covers the surface of the body. However, in the case of plating Ni, as Ni usually grows in a direction perpendicular to a surface of a body (a vertical direction), plating discontinuation may easily occur. Also, in the case that an area of the gap in which Ni is not plated is large, the plating of Sn may also be discontinuous, even though Sn grows in a horizontal direction when Sn is plated.

However, in the exemplary embodiment, as the first plating portions 131b and 132b having a thickness ranging from 0.3 μm to 1 μm is disposed between the second plating portions 131c and 132c and the electrode layers 131a and 132a, the plating discontinuation may be prevented, and moisture resistance reliability may improve.

Table 1 below shows results of experiment on a moisture resistance reliability effect obtained by using a first plating portion.

After a body including an internal electrode and a dielectric layer was prepared, a paste including Cu powder and glass was applied to both surfaces of the body in a length direction and sintered to form an electrode layer. Thereafter, first and second plating portions were formed on the electrode layer to have thicknesses as in Table 1, and a moisture load examination was carried out on 80 samples, and the results thereof are presented in Table 1 below.

In the moisture load examination, under conditions of temperature 85° C. and relative humidity 85%, reference voltage was applied for six hours in 40 samples, and 1.5 times reference voltage was applied for six hours in the other 40 samples. After the examination, samples in which an insulation resistance value was degraded to 1.0E+5 or lower was determined as defects, and a frequency of moisture load defects is presented in Table 1 below.

TABLE 1

| Examination Number | First Plating Portion Thickness of Sn Plated layer | Second Plating Portion | | Frequency of Moisture Load Defect |
|---|---|---|---|---|
| | | Thickness of Ni Plated layer | Thickness of Sn Plated layer | |
| 1 | 0.8 μm | 3 μm | 5 μm | 0% |
| 2* | 0 μm | 3 μm | 5 μm | 15% |

In the case of examination number 1 in which a thickness of the first plating portion was 0.8 μm, moisture resistance reliability was excellent as a frequency of moisture load defects was 0%.

However, in the case of examination number 2 in which the first plating portion is not formed, moisture resistance reliability was degraded as a frequency of moisture load defects was 15%.

Figure 4:
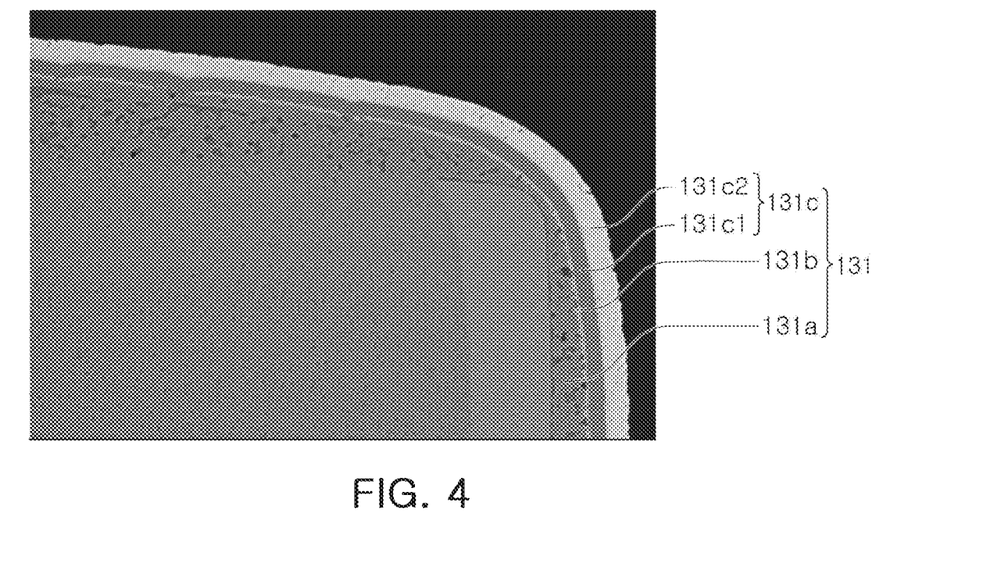
FIG. 4 is an image taken from a cross-section of a plating portion of examination number 1 in Table 1.
Figure 5:
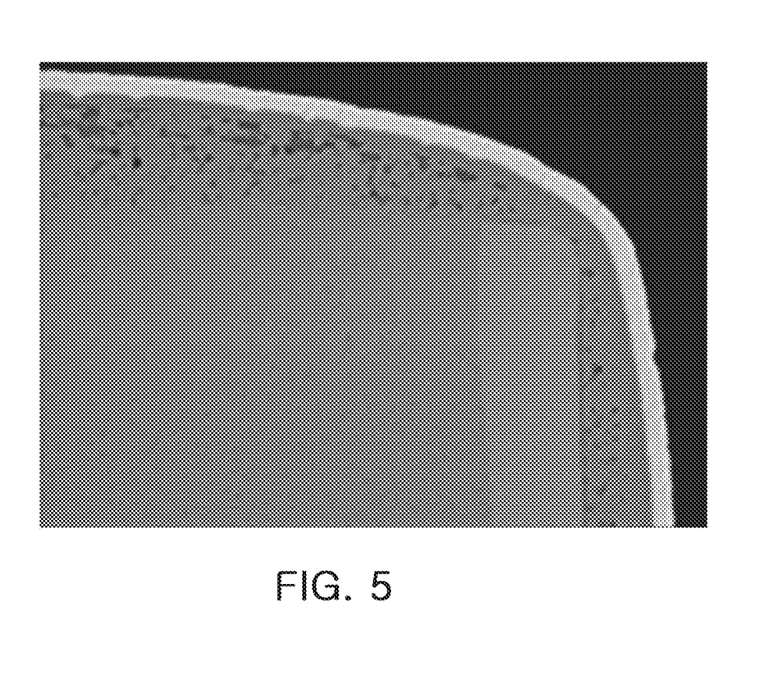
FIG. 5 is an image taken from a cross-section of a plating portion of examination number 2 in Table 1.

FIG. 4 is an image taken from a cross-section of a plating portion of examination number 1 in Table 1. FIG. 5 is an image taken from a cross-section of a plating portion of examination number 2 in Table 1.

Referring to FIGS. 4 and 5, in the case of examination number 1, an Ni plated layer 131c1 of a second plating portion was formed without being discontinued, whereas in the case of examination number 2, a first plating portion was not formed, and the Ni plated layer was discontinued.

Meanwhile, the first plating portions 131b and 132b may cover 90% of an area of electrode layers 131a and 132a.

There may be an area on the electrode layers 131a and 132a in which the first plating portions 131b and 132b are not formed. However, in the case in which the first plating portions 131b and 132b cover less than 90% of an area of the electrode layers 131a and 132a, a plating discontinuation phenomenon may occur on the second plating portions 131c and 132c.

Also, the first plating portions 131b and 132b may be Sn plated layers, and the second plating portions 131c and 132c may include the Ni plated layers 131c1 and 132c1 and the Sn plated layers 131c2 and 132c2 sequentially disposed on the first plating portions 131b and 132b.

Sn grows in a horizontal direction when Sn is plated, and Sn has excellent flexibility. Thus, plating discontinuation may be prevented more efficiently by implementing the first plating portions 131b and 132b as Sn plated layers.

In this case, an Sn—Ni intermetallic compound layer may be disposed in an interfacial area between the first plating portions 131b and 132b and the second plating portions 131c and 132c. The Sn—Ni intermetallic compound layer may improve bonding strength between the first plating portions 131b and 132b and the second plating portions 131c and 132c. For example, the Sn—Ni intermetallic compound layer may be formed as Sn and Ni mutually spread on a surface of the interfacial area between the Sn plated layers of the first plating portions 131b and 132b and the Ni plated layers 131c1 and 132c1 of the second plating portions 131c and 132c during a separate thermal treatment or reflow.

Alternatively, the first plating portions 131b and 132b may be a Cu plated layer, and the second plating portions 131c and 132c may include the Ni plated layers 131c1 and 132c1 and the Sn plated layers 131c2 and 132c2 sequentially disposed on the first plating portions 131b and 132b.

Cu grows in a horizontal direction when Cu is plated, and Cu has excellent flexibility. Thus, plating discontinuation may be prevented more efficiently by implementing the first plating portions 131b and 132b as Cu plated layers.

In this case, a Cu—Ni intermetallic compound layer may be disposed in an interfacial area between the first plating portions 131b and 132b and the second plating portions 131c and 132c. The Cu—Ni intermetallic compound layer may improve bonding strength between the first plating portions 131b and 132b and the second plating portions 131c and 132c. For example, the Cu—Ni intermetallic compound layer may be formed as Cu and Ni mutually spread on a surface of the interfacial area between the Cu plated layers of the first plating portions 131b and 132b and the Ni plated layers 131c1 and 132c1 of the second plating portions 131c and 132c during a separate thermal treatment or reflow.

Meanwhile, the second plating portions 131c and 132c may include the Ni plated layers 131c1 and 132c1 and the Sn plated layers 131c2 and 132c2 disposed on the first plating portions 131b and 132b, and thicknesses of the Ni plated layers 131c1 and 132c1 of the second plating portions may be within a range of 1 μm to 10 μm, and thicknesses of the Sn plated layers 131c2 and 132c2 of the second plating portions may be 1 μm to 10 μm.

There may be no need to particularly limit a size of the ceramic electronic component 100.

However, to simultaneously achieve miniaturization and high capacitance of the ceramic electronic component, the number of layers may need to be increased by configuring thicknesses of a dielectric layer and internal electrodes to be thin. Thus, the improvement of moisture resistance reliability according to the exemplary embodiment may become more prominent in the ceramic electronic component having a size of "0402" (0.4 mm×0.2 mm) or less.

Thus, in the case in which a distance between third and fourth surfaces of the body is defined as L, and a distance between fifth and sixth surfaces of the body is defined as W, L may be 0.4 mm or less, and W may be 0.2 mm or less.

According to the aforementioned exemplary embodiments, a multilayer ceramic capacitor having excellent moisture resistance reliability may be provided as a plating discontinuation phenomenon is prevented by disposing a first plating portion having a thickness ranging from 1 μm to 10 μm between an electrode layer and a second plating portion.

While the exemplary embodiments have been shown and described above, it will be apparent to those skilled in the art that modifications and variations could be made without departing from the scope of the present invention as defined by the appended claims.

What is claimed is:
1. A multilayer ceramic capacitor, comprising:
a body including a dielectric layer and an internal electrode; and
an external electrode disposed on the body,
wherein the external electrode comprises an electrode layer connected to the internal electrode, a first plating portion disposed on the electrode layer and having a thickness ranging from 0.3 μm to 1 μm, and a second plating portion disposed on the first plating portion, the first plating portion comprises an Sn plated layer, and the second plating portion comprises an Ni plated layer and an Sn plated layer sequentially disposed on the first plating portion, the first plating portion and the second plating portion have an Sn—Ni intermetallic compound layer disposed at an interfacial area therebetween, and the Sn—Ni intermetallic compound layer has an outer surface substantially covered by the Sn plated layer of the second plating portion.

2. The multilayer ceramic capacitor of claim 1, wherein the first plating portion covers 90% of an area of the electrode layer.

3. The multilayer ceramic capacitor of claim 1, wherein the Ni plated layer of the second plating portion has a thickness ranging from 1 μm to 10 μm, and the Sn plated layer of the second plating portion has a thickness ranging from 1 μm to 10 μm.

4. The multilayer ceramic capacitor of claim 1, wherein the electrode layer comprises a conductive metal and glass.

5. The multilayer ceramic capacitor of claim 1, wherein the dielectric layer has a thickness of 0.4 μm or less.

6. The multilayer ceramic capacitor of claim 1, wherein the internal electrode comprises first and second internal electrodes, the body comprises a capacitance forming portion forming capacitance including the first and second internal electrodes disposed to oppose each other with the dielectric layer interposed therebetween, and cover portions disposed on upper and lower portions of the capacitance forming portion, respectively, and each of the cover portions has a thickness of 20 μm or less.

7. The multilayer ceramic capacitor of claim 5, wherein the internal electrode has a thickness of 0.4 μm or less.

8. The multilayer ceramic capacitor of claim 1, wherein the internal electrode has a thickness of 0.4 μm or less.

9. A multilayer ceramic capacitor, comprising:
a body including a dielectric layer and an internal electrode; and
an external electrode disposed on the body,
wherein the external electrode comprises an electrode layer connected to the internal electrode, a first plating portion disposed on the electrode layer and having a thickness ranging from 0.3 μm to 1 μm, and a second plating portion disposed on the first plating portion, the first plating portion comprises a Cu plated layer, and the second plating portion comprises an Ni plated layer and an Sn plated layer sequentially disposed on the first plating portion, the first plating portion and the second plating portion have a Cu—Ni intermetallic compound layer at an interfacial area therebetween, and the Cu—Ni intermetallic compound layer has an outer surface substantially covered by the Sn plated layer of the second plating portion.

10. The multilayer ceramic capacitor of claim 9, wherein the first plating portion covers 90% of an area of the electrode layer.

11. The multilayer ceramic capacitor of claim 9, wherein the Ni plated layer of the second plating portion has a thickness ranging from 1 μm to 10 μm, and the Sn plated layer of the second plating portion has a thickness ranging from 1 μm to 10 μm.

12. The multilayer ceramic capacitor of claim 9, wherein the electrode layer comprises a conductive metal and glass.

13. The multilayer ceramic capacitor of claim 12, wherein the conductive metal includes Cu.

14. The multilayer ceramic capacitor of claim 9, wherein the dielectric layer has a thickness of 0.4 μm or less.

15. The multilayer ceramic capacitor of claim 9, wherein the internal electrode comprises first and second internal electrodes, the body comprises a capacitance forming portion forming capacitance including the first and second internal electrodes disposed to oppose each other with the dielectric layer interposed therebetween, and cover portions disposed on upper and lower portions of the capacitance forming portion, respectively, and each of the cover portions has a thickness of 20 μm or less.

16. The multilayer ceramic capacitor of claim 14, wherein the internal electrode has a thickness of 0.4 μm or less.

17. The multilayer ceramic capacitor of claim 9, wherein the internal electrode has a thickness of 0.4 μm or less.

* * * * *